United States Patent [19]

Wolters

[11] Patent Number: 4,628,565

[45] Date of Patent: Dec. 16, 1986

[54] WINDSCREEN WIPERS WITH AT LEAST TWO WIPER BLADES

[76] Inventor: Hans Wolters, Hertelerstrasse 9, 3044 Neuenkirchen, Fed. Rep. of Germany

[21] Appl. No.: 672,880

[22] Filed: Nov. 19, 1984

[30] Foreign Application Priority Data

Aug. 13, 1984 [DE] Fed. Rep. of Germany ....... 3429957

[51] Int. Cl.⁴ ............................. B60S 1/02; B60S 1/28

[52] U.S. Cl. ............................... 15/250.41; 15/250.42; 15/250.04

[58] Field of Search ............. 15/250.2, 250.35–250.42, 15/250.32, 250.04

[56] References Cited

U.S. PATENT DOCUMENTS 3,317,946 5/1967 Anderson ..................... 15/250.32 X
4,118,825 10/1978 Hoebrechts et al. ............ 15/250.32
4,339,839 7/1982 Knights ......................... 15/250.41 X

FOREIGN PATENT DOCUMENTS 3004478 8/1981 Fed. Rep. of Germany ... 15/250.41

*Primary Examiner*—Peter Feldman
*Attorney, Agent, or Firm*—Thomas R. Morrison

[57] ABSTRACT

A windscreen wiper comprises two wiper blades and a bridge structure for coupling the wiper blades, which bridge structure is a light weight profiled structure and comprises two longitudinal bars which run parallel to and in the longitudinal direction of the wiper blades and are designed uncurved with respect to the wiper blades and connected to each other by cross connecting webs.

6 Claims, 3 Drawing Figures

WINDSCREEN WIPERS WITH AT LEAST TWO WIPER BLADES

BACKGROUND OF THE INVENTION

1. Field of the Invention

The invention concerns a windscreen wiper comprising at least two wiper blades which are coupled with each other via a bridge construction which is constructed from a light-weight profile material and comprises two longitudinal bars connected to each other by cross connectors and extending in the longitudinal direction of the wiper blades.

2. Description of Prior Art In a known windscreen wiper of this type (German Offenlegungsschrift No. 30 04 478) the longitudinal bars are designed as structural elements curved arc-shaped upwards, i.e. relative to the wiper blades resp. the windscreen. Because of the curvature, in order to avoid too high constructions, such bars can only have limited longitudinal dimensions, whereby on the other hand only insufficient pressure on the ends of the wiper blades can be achieved. This is especially the case if these are extra long because of large windscreens or large wiping surfaces e.g. in touring or sports cars. Due to too little pressure in such cases the wiping effect is insufficient especially if the screen is very dirty or if there is a great amount of water (heavy rain, high speed). On the other hand due to the curvature and the thus resulting high constructions the aerodynamic resp. travelling resistance is increased. Above all it is impossible to cover such windscreen wipers in aerodynamically constructed vehicles by corresponding construction elements entirely in the lower region of the windscreen, i.e. by the bonnet or its limitations without additional constructional measures on the vehicle bodywork. All these facts show that curved windscreen wipers function in contrast to a main goal of modern car bodies, which is to make them as streamlined as possible and to reduce the resistance coefficients of the vehicle.

3. Objects of the Invention

It is therefore an essential object of the invention to overcome the described disadvantages of known windscreen wipers and to achieve a compact bridge construction of as low a height as possible. It is a further important object to enable a close and firm engagement of the wiper blades with the windscreen over as large an area as possible of the total length of the wiper blades.

SUMMARY OF THE INVENTION

In a windscreen wiper arrangement comprising at least two wiper blades which are coupled with each other via a bridge construction made from a light-weight profile material and comprises two longitudinal bars connected to each other by cross connector elements and extending in the longitudinal direction of the wiper blades, this object is achieved according to the invention in that the longitudinal bars are designed essentially uncurved in height and running parallel to the wiper blades. It is thus made possible to achieve a mounting of the bridge construction which is easy to cover with the help of the prescribed bodywork parts of the vehicle with turned off windscreen wipers. It is also possible to provide very long wiper blades which are sufficiently close-fitting resp., in the case of short wiper blades, to achieve an especially high pressure of the bridge construction in the region of the free ends of the wiper blades. With the design according to the invention a longer construction piece compared to the curved windscreen wiper bars can be constructed using the same amount of material. Apart from that a linear form simplifies injection moulding of such pieces in that it requires simpler tools and makes a removal from the mould more easy, such linear elements can be formed longer than the curved ones which are limited in constructional height, so that a higher pressure in the end regions of longer wiper blades can be achieved. Thus the extension of the bridge construction according to the invention does not lead to an increase in the distance from the screen in the middle as with the known curved constructions.

In an advantageous embodiment using the basic idea of the invention, which is to reduce the constructional height of the wiper blade carriers and to achieve as compact a construction as possible it is appropriate that a mounting piece, by means of which the bridge structure can be mounted on a wiper arm used to drive the windscreen wiper be formed integrally with the longitudinal bars in the middle region thereof, this mounting piece expediently being formed as a constructional element finishing within the upper edge of the longitudinal bars. In known double windscreen wipers the mounting elements for the wiper arm were provided as insertable extra elements (adaptors) which projected over the upper edge of the longitudinal bars and in addition to their height caused by the curvature, formed a further obstruction to hidden mounting. In contrast thereto and in accordance with the invention the upper edge of the longitudinal bars determines the overall constructional height of the windscreen wipers which therefore in rest position can be mounted easily totally concealed under the bodywork coating elements of the bonnet.

In order to be able to manufacture a connection for the wiper arm which does not influence the constructional height, in an appropriate embodiment, the mounting piece can form a projection projecting partially beyond at least one of the lateral limitations of the longitudinal bars and carry a recess for receiving the wiper arm in this region. As a rule, the width of the bridge structure does not need to be increased, or only very minimally since the bridge structures common today have a contraction in the central mounting area anyway. This contraction is provided, on the one hand, for aesthetical reasons and, on the other, for technical reasons, especially for a faultfree guiding of the known adaptors.

For the same purpose, appropriately a cross-web for receiving a jet for the water supply can be arranged between the longitudinal bars near their ends. Thereby, not only an arrangement of the connection as well as the exit for the spraying water within the structural height of the windscreen wipers occurs, but the water supply is in a position favourable with respect to the water distribution onto the screen. It is especially appropriate to provide this cross-web, in a lower region of the windscreen wiper relative to its pivot axis, because then due to the relative wind or air pressure the sprayed water will be pushed upwards on the windscreen and is distributed equally on the screen.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

Figure 1:
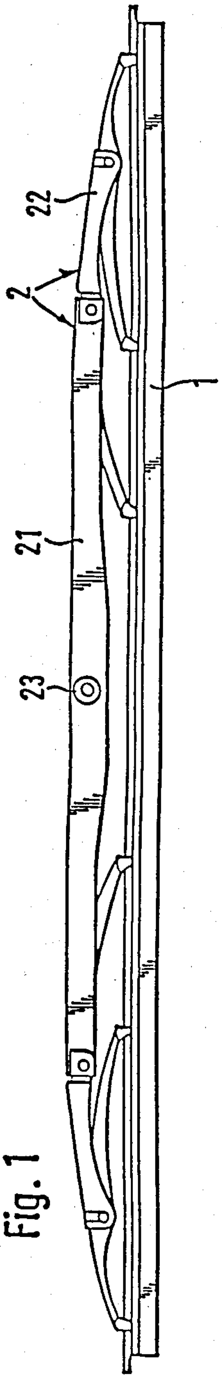
FIG. 1 shows a side view of a windscreen wiper according to the invention.
Figure 2:
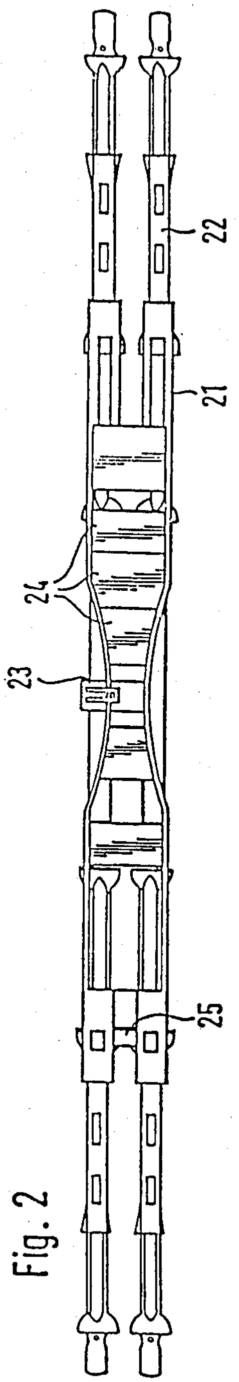
FIG. 2 shows a top view of the windscreen wiper of FIG. 1.
Figure 3:
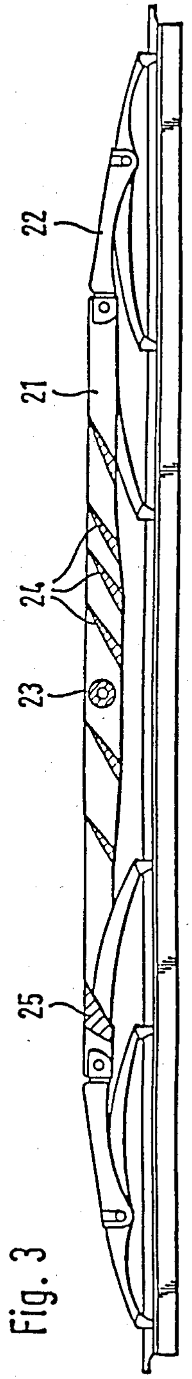
FIG. 3 shows a cross-sectional view according to FIG. 1.

A windscreen wiper comprises essentially two wiper blades 1 which are carried by a bridge structure 2 made of a light-weight profiled plastic and thus determines a double (tandem) or twin wiper. The design for such a bridge structure for double wipers with their various elements and lever systems is shown and described in principle in German Offenlegungsschrift No. 30 04 478 so that here there is no need for a detailed description of parts which are not important for the invention and reference can be made to the above printed publication. The wiper blades 1 are placed on lever systems 22 which are mounted on two longitudinal bars 21 which extend parallel to each other. The longitudinal bars 21 are designed as essentially linear bars running parallel to the wiper blades 1. Especially their upper edge runs linear while in the middle region a minimal bulge downwards—for increasing the stiffness in this region—as well as a contraction—which has proved expedient due to the adaptor arrangement for a wiper arm hither to known—are provided. In this region a transversely running mounting piece 23 for a wiper arm not shown here is arranged between both longitudinal bars 21. This mounting piece 23 has essentially a cylindrical basic shape and, on one side, extends, as can be seen from FIG. 2 past the contraction of the longitudinal beams 21. From this side the bridge structure 2 is attached to a corresponding pin or pivot on the wiper arm and fixed thereto.

Profiled cross-connectors 25 are positioned between both longitudinal bars 21 which cross-connectors connect the longitudinal bars 21 within the bridge structure and are designed in the manner of aerodynamically expedient wing profiles. They thus provide for an optimum pressure of the windscreen wipers against the windscreen using the stream conditions especially due to the air stream caused by the movement of the car.

One of the cross connectors is designed as a mounting bar 25 in the end region of the longitudinal bars. This can be formed integrally on one of the longitudinal bars 21 by moulding or by any other appropriate type of attachment between both bars 21. This mounting bar is used to mount a jet which can be inserted in the mounting bar 25 by forming a hole in the latter and thus mounted between both bars in order to effect a water supply at an especially advantageous place in the wiper system for cleaning the windscreen. The side of the bridge structure 2, on which the mounting bar is positioned, will represent the lower region when the windscreen wiper is assembled and moved so that cleaning water squirted onto the windscreen can wander upwards due to the pressure caused by the air flow. The water is held between the two wiper blades and not wasted by being pressed aside. Thus a very much improved distribution of water on the windscreen is achieved and consequently an improved cleaning effect in addition to the double wiper effect.

A further advantage of the bridge structure 2 distinguished by the low structural height due to lacking curvature lies in that the transverse profiles 24 producing the connection between both longitudinal bars come to lie with their wing profile design much nearer to the windscreen to be cleaned so that the flow from the screen affects the aerodynamic profile essentially more favourably and a more strongly increased pressure of the wiper blades on the screen results.

As can be seen from the drawing all structural elements essential for the function of the windscreen wiper system can be mounted in a space-saving manner within the low assembly height determined by the upper edge of the longitudinal bars 21 and the lower edge of the wiper blades 1. It can also be seen that, when the windscreen wipers are in rest position this construction can be hidden relatively simply behind bodywork parts provided therefor in order to form no additional resistance during driving of the car when the windscreen wipers are not in use, so that they do not affect the resistance coefficient of the vehicle.

What is claimed is:

1. A windscreen wiper comprising at least two individual, essentially linear wiper blades defining a longitudinal direction and a bridge structure means coupling said wiper blades with each other in spaced, parallel relationship, said bridge structure means being provided as a light-weight low profile structure and comprising two elongated longitudinal bars connected to each other by cross-connector means, said bars extending in said longitudinal direction of said wiper blades, said longitudinal bars being substantially uncurved with respect to said wiper blades and running parallel to the latter, and having linear upper edges spaced a minimum distance from said wiper blades, whereby said profile of said bridge structure is sufficiently low to minimize the aerodynamic resistance of said windscreen wiper while in use.

2. A windscreen wiper as claimed in claim 1, wherein a mounting piece for mounting said bridge structure means on a wiper arm for driving said wipers is formed integrally with said longitudinal beams in the central region of their longitudinal extension, said mounting piece being designed as a structural element located beneath the upper edge of said longitudinal beams.

3. A windscreen wiper as claimed in claim 2, wherein said mounting piece forms a projection extending partially beyond at least one of the lateral limitations of said longitudinal bars and carries mounting means for receiving said wiper arm in this region.

4. A windscreen wiper as claimed in claim 1, wherein one of the said cross-connector means is designed as a mounting bar for mounting a jet for supplying water in a region of said longitudinal bars lying near the ends thereof and between said longitudinal bars.

5. A windscreen wiper as claimed in claim 2, wherein one of the said cross-connector means is designed as a mounting bar for mounting a jet for supplying water in a region of said longitudinal bars lying near the ends thereof and between said longitudinal bars.

6. A windscreen wiper as claimed in claim 3, wherein one of the said cross-connector means is designed as a mounting bar for mounting a jet for supplying water in a region of said longitudinal bars lying near the ends thereof and between said longitudinal bars.

* * * * *